(12) United States Patent
Fish et al.

(10) Patent No.: US 6,924,953 B2
(45) Date of Patent: Aug. 2, 2005

(54) DUAL COMMUNICATION PORT SHARING APPARATUS

(75) Inventors: Wilson Massey Fish, Yukon, OK (US); John Garrett Lingo, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 304 days.

(21) Appl. No.: 10/170,046

(22) Filed: Jun. 10, 2002

(65) Prior Publication Data

US 2003/0107834 A1 Jun. 12, 2003

Related U.S. Application Data (60) Provisional application No. 60/339,657, filed on Dec. 12, 2001.

(51) Int. Cl.⁷ .................................................. G11B 5/02
(52) U.S. Cl. ............................................. 360/69; 360/75
(58) Field of Search ............................... 360/69, 46, 49, 360/51, 75, 77.02, 77.08; 711/4, 112, 113; 710/107, 108, 109, 113, 114, 110, 112

(56) References Cited

U.S. PATENT DOCUMENTS

| | | | | |
|---|---|---|---|---|
| 5,255,136 A | * | 10/1993 | Machado et al. | 360/77.08 |
| 5,325,247 A | * | 6/1994 | Ehrlich et al. | 360/78.04 |
| 5,465,343 A | * | 11/1995 | Henson et al. | 711/112 |
| 5,477,103 A | * | 12/1995 | Romano et al. | 360/77.08 |
| 5,511,179 A | * | 4/1996 | Chai-I | 711/149 |
| 5,586,306 A | | 12/1996 | Romano et al. | 360/77.08 |
| 5,587,850 A | * | 12/1996 | Ton-that | 360/77.08 |
| 5,757,582 A | * | 5/1998 | White et al. | 360/98.01 |
| 5,771,131 A | * | 6/1998 | Pirzadeh | 360/77.08 |
| 5,914,828 A | * | 6/1999 | Bruner et al. | 360/69 |
| 5,938,745 A | | 8/1999 | Boyle | |
| 6,279,054 B1 | | 8/2001 | Boyle | |
| 6,445,522 B1 | * | 9/2002 | Tsunoda et al. | 360/45 |
| 6,519,104 B1 | * | 2/2003 | Cloke et al. | 360/51 |
| 6,557,113 B1 | * | 4/2003 | Wallentine et al. | 360/48 |
| 6,584,516 B1 | * | 6/2003 | Hill | 360/77.08 |
| 6,624,957 B1 | * | 9/2003 | Yun | 360/46 |
| 6,678,109 B2 | * | 1/2004 | Kagami et al. | 360/77.08 |
| 2002/0091888 A1 | * | 7/2002 | Streitenberger et al. | 710/305 |

FOREIGN PATENT DOCUMENTS

JP 02093755 A * 4/1990

\* cited by examiner

*Primary Examiner*—David Hudspeth
*Assistant Examiner*—James L Habermehl
(74) *Attorney, Agent, or Firm*—Fellers, Snider, et al.

(57) ABSTRACT

An arbitration and data source selection mechanism arbitrating access to a shared communication port between a servo engine and a controller of a disc drive is disclosed. In a preferred embodiment, the arbitration and data source selection mechanism, the shared communication port, the servo engine and the controller collectively share a common die of an application specific integrate circuit (ASIC). Servo control code and control code are each loaded into the ASIC for operation of the disc drive. The servo engine is allowed to hold service of the shared serial port dedicated to the servo control code for any length of time required by the servo engine. During periods of non-use by the servo control code, the servo engine releases the shared serial port to the controller for dedicated use by the control code, for a predetermined period of time.

23 Claims, 5 Drawing Sheets

DUAL COMMUNICATION PORT SHARING APPARATUS

RELATED APPLICATIONS

This application claims priority to U.S. Provisional Application No. 60/339,657 filed Dec. 12, 2001, entitled Dual Serial Port Sharing Apparatus.

FIELD OF THE INVENTION

This invention relates generally to the field of magnetic data storage devices, and more particularly, but not by way of limitation, to a dual communication port sharing apparatus for a disc drive.

BACKGROUND

Disc drives are used for data storage in modern electronic products ranging from digital cameras to computers and network systems. Typically, a disc drive includes a mechanical portion, or head disc assembly, and electronics in the form of a printed circuit board assembly mounted to an outer surface of the head disc assembly. The printed circuit board assembly controls functions of the head disc assembly and provides a communication interface between the disc drive and a host being serviced by the disc drive.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Disc drives using magneto resistive read/write heads typically use an inductive element, or writer, to write data to information tracks of the recording surface and a magneto resistive element, or reader, to read data from the information tracks during drive operations.

The disc drive market continues to place pressure on the industry for disc drives with increased capacity at a lower cost per megabyte and higher rates of data throughput.

As improvements continue to propagate and new functionalities are introduced into disc drives, the cost of the electronics used in supporting those improvements and newly introduced functionalities emerges as a concern for maintaining a competitive posture in the marketplace. Typically, as part of the electronics supporting the functions of a disc drive, a disc drive is likely to include a microprocessor based controller, a pre-amplifier, host to drive interface electronics, analog to digital converts, a read/write channel and an application specific integrated circuit (ASIC) based servo controller.

In prior disc drives, communication between the read/write heads and either the servo ASIC or the microprocessor-based controller is typically supported by a number of serial ports communicating with the read/write channel. In a typical drive, a servo ASIC is configured with dual serial ports, one port for handling servo data and the other for handling read/write data. In such instances, the microprocessor-based controller typically communicates directly with the servo ASIC, and the servo ASIC manages the functions of the serial ports.

A primary cost component of the electronics of a disc drive is the servo ASIC device, and pin count of the servo ASIC has a direct relationship to the overall cost of the device. As such, challenges remain and a need persists for a reduction in the actual pin count of the servo ASIC, or an effective reduction in servo ASIC pin count. An actual reduction in pin count provides a direct cost reduction for a disc drive, while an effective reduction in pin count fosters the support of additional functionality absent a cost increase in the electronics to support the additional functionality. It is to this and other features and advantages set forth herein that embodiments of the present invention are directed.

SUMMARY OF THE INVENTION

As exemplified by preferred embodiments, the present invention provides an application specific integrated circuit adapted to provide servo control and data transfer control for a disc drive and includes a shared communication port with access to the port controlled by an arbitration and data selection mechanism, which arbitrates the use of the port between a servo process of a disc drive and a controller process of the disc drive for transfer of servo data from a servo FIFO array of the servo process, and for transfer of control data from a control FIFO array between the application specific integrated circuit and read/write channel electronics of the disc drive. These and various other features and advantages, which characterize the present invention, will be apparent from a reading of the following detailed description and a review of the associated drawings.

DETAILED DESCRIPTION

Figure 1:
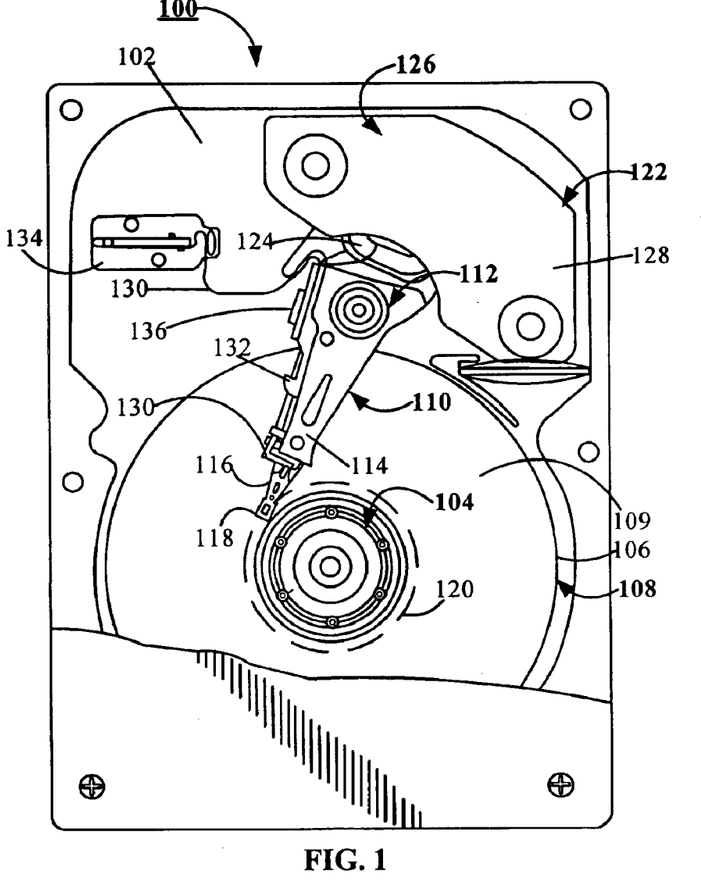
FIG. 1 is a top plan view of a disc drive that incorporates a dual communication sharing apparatus in accordance with the present invention.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not separately depicted) used for storing bit patterns or data. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drive 100 and reads stored information from the concentric information tracks 120 for passage to a host (not shown) serviced by the disc drive 100.

The terms "servoing" and "position-controlling," as used herein, mean maintaining control of the read/write head 118 relative to the rotating recording surfaces 109 during operation of the disc drive 100. Servoing to or on the information track 120, the actuator assembly 110 is controllably positioned by a voice coil motor assembly 122. The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head 118 are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
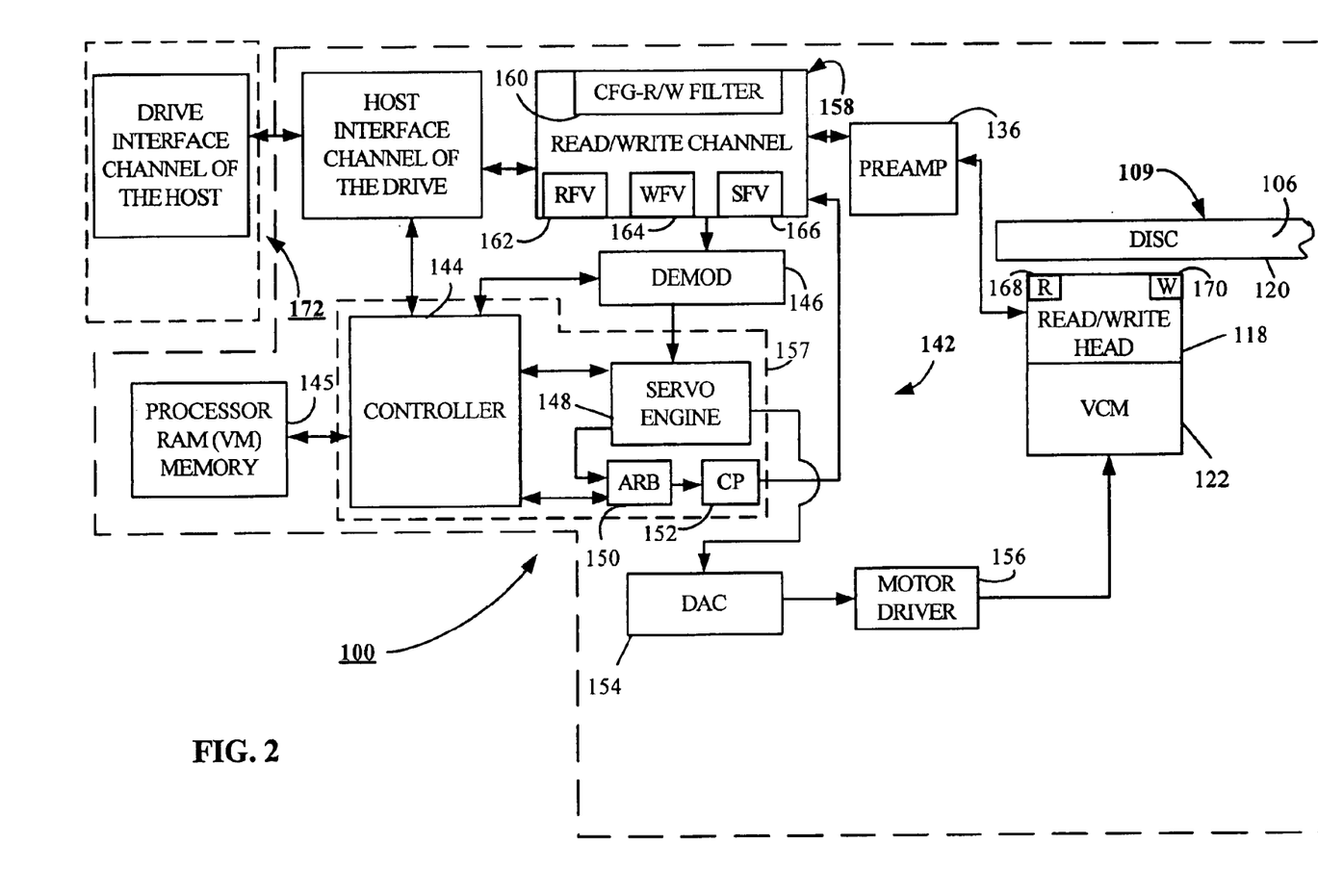
FIG. 2 is a functional block diagram of control circuitry of the disc drive of FIG. 1.

Turning to FIG. 2, position-controlling of the read/write head 118 is provided by the positioning mechanism (not separately shown) operating under the control of a servo control circuit 142 programmed with servo control code, which forms a servo control loop. The servo control circuit 142 includes a micro-processor controller 144 (also referred to herein as controller 144), a volatile memory or random access memory (VM) 145, a demodulator (demod) 146, an application specific integrated circuit (ASIC) hardware-based servo controller ("servo engine") 148, an arbitration and data source selection mechanism (ARB) 150, a shared communication port (CP) 152 (in a preferred embodiment, the shared communication port 152 is a serial port), a digital to analog converter (DAC) 154 and a motor driver circuit 156. Optionally, the controller 144, the servo engine 148, the arbitration and data source selection mechanism (ARB) 150 and the shared communication port (CP) 152 are portions of an application specific integrated circuit 157. Typically, a portion of the random access memory 145 is used as a cache for data read from the information track 120 awaiting transfer to a host connected to the disc drive 100 and for data transferred from the host to the disc drive 100 to be written to the information track 120. The components of the servo control circuit 142 are utilized to facilitate track following algorithms for the actuator assembly 110 (of FIG. 1) and more specifically for controlling the voice coil motor 122 in position-controlling the read/write head 118 relative to the selected information track 120 (of FIG. 1).

The demodulator 146 conditions head position control information transduced from the information track 120 of the rotatable recording surface 109 to provide position information of the read/write head 118 relative to the information track 120. The servo engine 148 generates servo control loop values used by the control processor 144 in generating command signals such as seek signals used by voice coil motor 122 in executing seek commands. Control loop values are also used to maintain a predetermined position of the actuator assembly 110 during data transfer operations. The command signals generated by the control processor 144 and passed by the servo engine 148 are converted by the digital to analog converter 154 to analog control signals. The analog control signals are used by the motor driver circuit 156 in position-controlling the read/write head 118 relative to the selected information track 120, during track following, and relative to the rotatable recording surface 109 during seek functions.

In addition to the servo control code program of the application specific integrated circuit 157, control code is also programmed into the application specific integrated circuit 157 for use in executing and controlling data transfer functions between a host 172 and the disc drive 100. A read/write channel electronics 158, operating under control of the controller 144 executing the control code, passes data received from the host 172 for storage on the disc 106 and passes data read from the disc 106 back to the host 172. The read/write channel electronics 158, includes a configurable read/write filter 160, a read filter value register 162, or write filter value register 164 and a servo filter value register 166. In a preferred embodiment, filter values of the configurable read/write filter 160 depend on a frequency of information being read by a read element 168 of the read/write head 118 during a read operation. If the information being read is servo data, filter values from the servo filter value register 166 are loaded into configurable read/write filter 160. However, if the information being read is stored information type of data, also referred to as customer data, filter values from the read filter value register 162 are loaded into the configurable read/write filter 160. During a write operation, filter values from the write filter value register 164 are loaded into the configurable read/write filter 160, and read/write channel 158 passes customer information to be stored on information track 120 to a write element 170 of a read/write head 118.

In a preferred embodiment, the servo data is written at constant frequency while customer data are either written to or read from the information track 120 at a frequency dependent on a radial position of the read/write head 118 relative to the rotatable recording surface 109. As such, among the types of information passed between the ASIC 157 to the read/write channel electronics 158 during operation of disc drive 100 are appropriate filter values for use in executing a particular operation called for by the controller 144.

The communication port 152 provides the structure for transfer of information between the ASIC 157 and the read/write channel 158, while the arbitration and data source selection mechanism (ARB) 150 provides means for controlling access to the communication port 152 during the operation of the disc drive 100.

Figure 3:
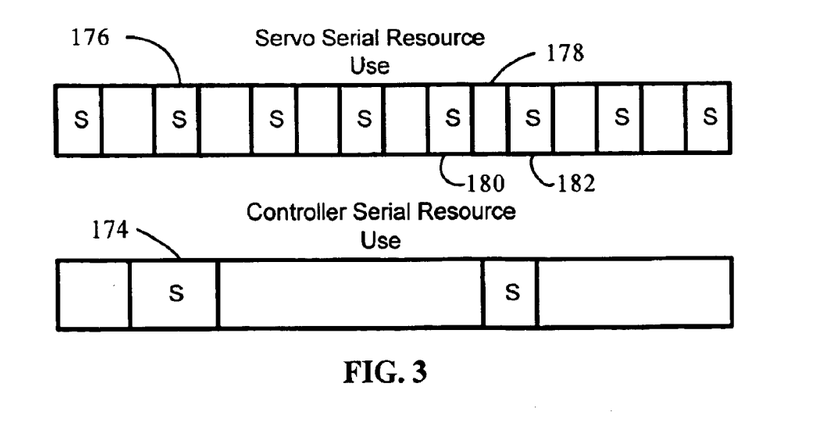
FIG. 3 is a diagrammatic representation of demand placed on the dual communication sharing apparatus of the disc drive of FIG. 1 by a controller process operating under control code of the disc drive of FIG. 1, and a servo process operating under servo code of the disc drive of FIG. 1.

FIG. 3 illustrates the periodic, uncompromising real time nature of a need for the shared communication port 152 by the servo control code of the servo control circuit 142, and the much less frequent need for the shared communication port 152 by the control code of the controller 144. It is noted that, although the need for the shared communication port 152 by the control code is less frequent than is the demand for the resource by the servo control code during periods of high use for the servo code, a duration for each period of use of the shared communication port 152 by the control code, shown by 174, is greater than a period of use for the shared communication port 152 by the servo control code as shown by 176.

In a preferred embodiment of the present invention, resolution of the needs of the servo control code and the control codes is provided in a manner that maximizes simplicity, ease of use and performance. Simplicity is maintained by not requiring either code to know the state of the other. Each code is allowed use of the resource without specific knowledge of which code has control of the shared communication port 152.

Since the servo control code must be able to predict with absolute certainty that it will successfully capture the shared communication port 152 and transfer data within a strict timing budget, the servo code is allowed to capture the resource for any required length of time.

By design, the controller code will be able to capture the shared communication port 152 for a maximum time of one fall FIFO data transfer from a control process FIFO array (discussed below). This time limit is enforced by the hardware. Since the control code can only reserve the shared communication port 152 for the actual time required to transfer at most a full FIFO number of words (N), an advance lock reservation time is deterministic. The maximum size of one full FIFO data transfer is specific to each disc drive type and determined by a minimal amount of time 178 available between adjacent periods of use 180 and 182 of the servo control code.

This mechanism ensures that the control code may reserve the shared communication port 152 for at most the amount of time required to transfer a full FIFO data transfer. This in turn ensures that the greatest amount of time the servo code is blocked from use of the shared communication port 152 is known in advance and is a constant related only to the transfer rate multiplied by the maximum number of words a block of the FIFO array can hold.

Because of the low frequency of need for the shared communication port 152 by the control code, information to be transferred from the ASIC 157 to the read/write channel electronics 158 is organized into FIFO data transfer blocks of predefined word length (N), which are then transferred between multiple adjacent periods of use, such as 180 and 182, of the shared communication port 152 by the servo control code. In essence, the control code is constrained to transferring at most N words at a time, but may do so during each period of non-use of the shared communication port 152 by the servo code, and the servo code may retain the shared communication port for as long as needed.

Figure 4:
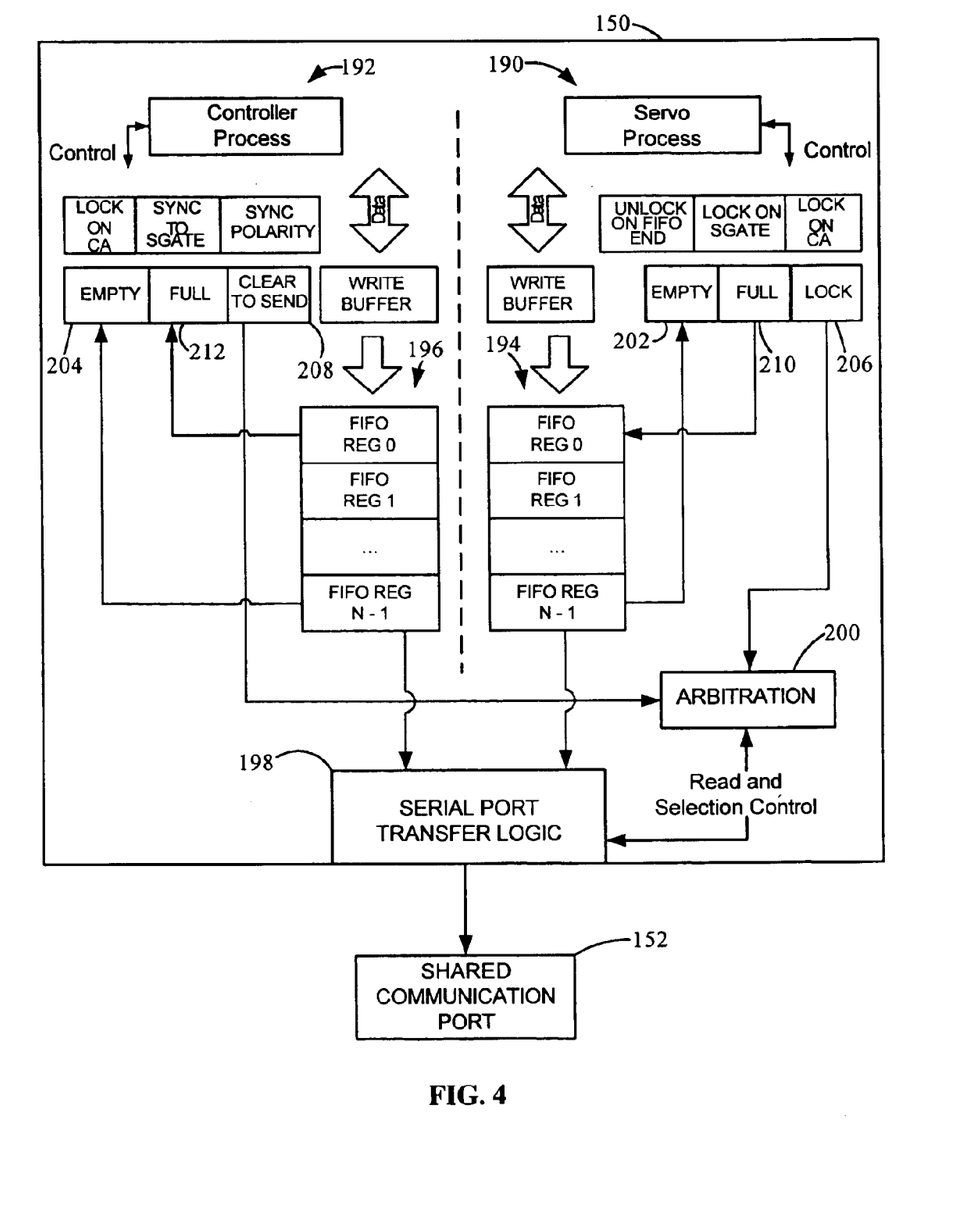
FIG. 4 is a logic diagram of an arbitration and data source selection mechanism of the functional block diagram of control circuitry of FIG. 2.

FIG. 4 shows a servo process 190 (representing an execution of the servo code) and a controller process 192 (representing an execution of the control code) being operated on by the arbitration and data source selection mechanism (ARB) 150. Each process has a parallel word data register that serves as a data input interface to one of two word FIFO arrays, 194 and 196 respectively. The implementation of the FIFO is not important and could be constructed as a trickle down (cascading) register array or as a RAM-based circular buffer.

In a preferred embodiment, either process can write to their respective data FIFO array interfaces asynchronously and in a simultaneous or overlapping manner. As words appear at a serial port transfer logic interface portion 198, each in turn is serialized and passed to the communication port 152 and transferred across a communication bus, which in a preferred embodiment is a serial bus.

The determination of which FIFO words are transferred in the event both FIFO's are not empty is arbitrated and controlled by arbitration logic 200. The arbitration logic 200 uses an EMPTY signal (202 and 204 respectively as reflected in the serial port transfer logic portion 198), a LOCK signal (206) and a CLEAR TO SEND signal 208 to arbitrate between competing requests.

Either EMPTY signal, 202 or 204, present in the serial transfer logic portion 198, indicates that the respective FIFO contains no words. If the controller process FIFO EMPTY=FALSE then COMMAND COMPLETE=FALSE. Using this gating mechanism the media manager will not start a disc sequencer (not shown) until the controller process transfer has completed.

Under the servo process 190, the EMPTY signal 202 is used as a means to determine when it is safe to set LOCK signal 206 to FALSE. Although the servo process 190 may clear LOCK signal 206 after completing a final write to the FIFO array 194, the LOCK signal 206 remains in effect until the servo FIFO array 194 is empty.

The FULL signal, 210 for the servo process 190 and 212 for the controller process 192, indicates that their respective FIFO array can accept no more words. Writing to FIFO array 194 while FULL signal 210=TRUE or to FIFO array 196, while FULL signal 212=TRUE will cause the word being written to be lost.

When the servo process 190 sets a "lock bit" for the LOCK signal 206, the control code will be unable to capture the shared communication port 152. As discussed further below, the servo code ensures that the control code is given access at some point during periods of high use of the shared communication port, for example during an execution of a seek operation.

The CLEAR TO SEND signal 208 indicates to the arbitration logic 200 that the control code has written at least one word into the FIFO array 196 and wishes to affect a transfer whenever the servo code is not controlling the shared communication port. If CLEAR TO SEND signal 208 is asserted and EMPTY=TRUE, then CLEAR TO SEND signal 208 is reset to FALSE by the hardware. In a preferred embodiment, the controller process 192 writes multiple register commands into the FIFO array 196 before setting CLEAR TO SEND signal 208 to take maximum advantage of the FIFO array 196 buffering capability.

Figure 5:
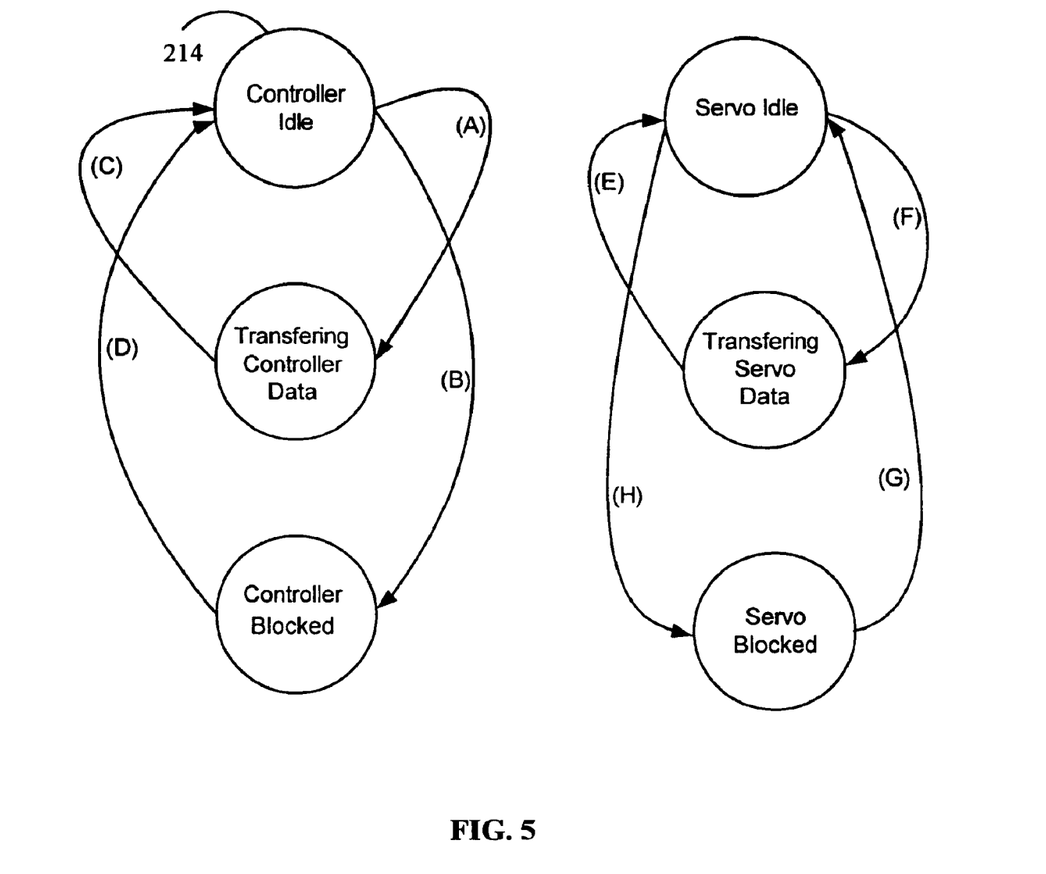
FIG. 5 is a transfer state behavior diagram for a preferred embodiment of the arbitration and data source selection mechanism of FIG. 4.

The transfer state behavior diagram of FIG. 5 shows the states for each FIFO block transfer action for the servo process 190 and controller process 192 of FIG. 4. A state equation reference table is provided below to aid in viewing the transfer state behavior diagram of FIG. 5.

| State | Equation |
|-------|----------|
| (A) | ((EMPTY = = FALSE) & (CLEAR_TO_SEND = = TRUE)) |
| (B) | (LOCK = = TRUE) |
| (C) | (EMPTY = = TRUE) |
| (D) | (LOCK = = FALSE) |
| (E) | (EMPTY = = TRUE) |
| (F) | (EMPTY = = FALSE) |
| (G) | (CLEAR_TO_SEND = = FALSE) |
| (H) | ((CLEAR_TO_SEND = = TRUE) & (LOCK = = FALSE)) |

As shown by FIG. 5, the servo code is blocked only when in IDLE state 214 AND CLEAR TO SEND signal 208 is TRUE AND LOCK signal 206 is FALSE.

This allows the servo process 190 to reserve (via LOCK signal 206) the shared communication port 152 whenever the servo process 190 anticipates a required need for the shared communication port 152. Additionally, this lock mechanism blocks the control code from use of the shared communication port 152, but not from use of its FIFO array 196 (of FIG. 4). This provides a mechanism for the servo code to reserve the shared communication port 152 well in advance of an anticipated use. Since the controller process 192 can only reserve the resource for the actual time required to transfer at most a full FIFO number of words (N), the advance lock reservation time is deterministic.

In a preferred embodiment, to transfer words over the serial bus, the controller process 192 may write at most N words into its FIFO array 196 and then indicate to the arbitration logic 200 that it has finished writing words by setting CLEAR TO SEND signal 208. This mechanism ensures that the controller may reserve the serial transfer mechanism for, at most, the amount of time required to transfer a full FIFO block data transfer. This in turn ensures that the greatest amount of time the servo process is blocked from use of the shared communication port 152 is known in advance and is a constant related only to the transfer rate multiplied by the maximum number of words the FIFO block can hold.

In a preferred embodiment, a single parallel read register (not shown) with a valid bit for indicating that data has been received is used. To request a read, either the servo process 190 or the controller process 192, using the particular mechanism supplied for writing the FIFO arrays (194 or 196 respectively), need only write the number of words required for selecting a serial device register (preamp bank, for example) and the register to read. The requested data is returned in the read register.

Figure 6:
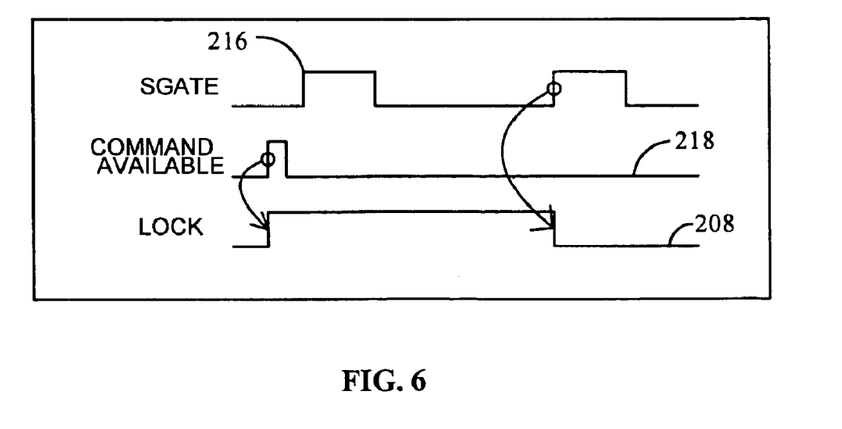
FIG. 6 is a timing diagram for synchronization of a LOCK signal used in an alternate preferred embodiment of the arbitration and data source selection mechanism of FIG. 4.

FIG. 6 shows additional signals SGATE 216 and CommandAvailable 218 used in an alternate preferred embodiment to "lock on CA." The alternate preferred embodiment provides an "auto lock on CommandAvailable" function. When enabled the "lock bit" of LOCK signal 208 is set activating LOCK signal 208 in response to the CommandAvailable 218 Flag going active. Triggered by the SGATE 216 signal going from inactive to active, the LOCK signal 208 is Auto cleared after 2 servo sectors, if the servo code has not, during that time, set its firmware controlled "lock bit." The purpose for activating lock at CommandAvailable 218 is to ensure that any controller process 192, FIFO array 196 transmission that may be in progress is completed before the point in a servo seek command where the servo code needs to use the shared communication port 152. The purpose for auto clearing the lock after 2 servo sectors is to avoid the need for servo code to "remember" to clear the auto-lock for all commands other than seek commands.

For the servo process 190, a "LOCK on SGATE" function provides an "auto lock on Sgate" feature. When this function is enabled, the "lock bit" of the LOCK signal 208 is automatically activated on the leading edge of the next Sgate, and automatically cleared on the leading edge of the next following Sgate, provided the servo code has not, during that time, set its firmware controlled "lock bit." This is a "one shot" event. The servo code preferably re-enables this feature before each servo sector to be locked. The purpose for activating lock at Sgate is to ensure that any controller process 192 FIFO array 196 transmission in progress is completed before the point in track following where the servo needs to use the shared communication port 152 to "coast the demodulator over a known flawed sector." The purpose for auto clearing the lock on the following Sgate is to ensure that the servo code does not forget to "unlock," and leave the shared communication port 152 tied up for extended periods, when the shared communication port could be placed in service of the control code.

Also for the servo process 190, the arbitration logic 200 provides "UNLOCK ON FIFO END" signal (not shown), which automatically clears the "lock bit" when the shared communication port 152 has completed transmission of the contents of the servo process 190 FIFO array 194. The purpose for this feature is to reduce servo complexity by not having to have the servo code respond to the completion of a transmission in order to release the "lock bit."

Figure 7:
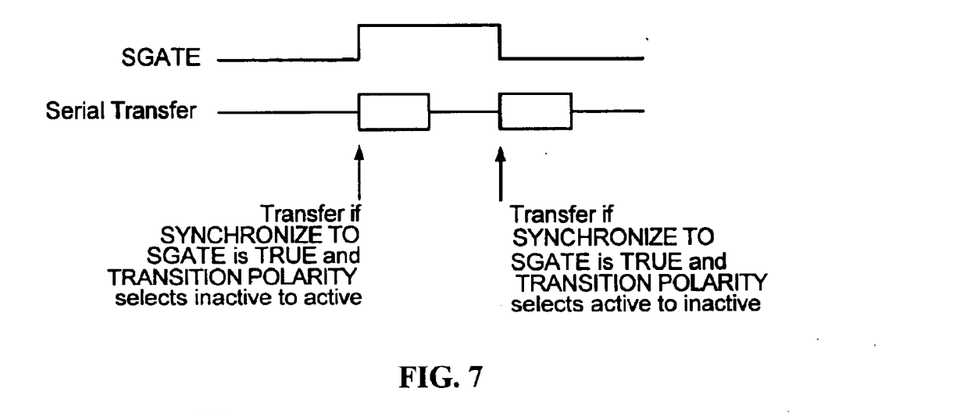
FIG. 7 is a timing diagram for transfer of controller information synchronized to a state change of a servo gate for an alternate preferred embodiment of the arbitration and data source selection mechanism of FIG. 4.

Turning to FIG. 7, shown therein is the behavior of two additional control signals for use in timing a transfer of information from the FIFO array 196 of the controller process 192 across the shared communication port 152 when the shared communication port is dedicated to the control code. Use of a "SYNCHRONIZE TRANSFER TO SGATE" control bit, when set, will gate transfer of FIFO array 196 contents at the next SGATE transition. A "SYNCHRONIZATION POLARITY" control bit is used in conjunction with the "SYNCHRONIZE TRANSFER TO SGATE" control bit. The "SYNCHRONIZATION POLARITY" control bit defines the polarity of the sampled transition. If SYNCHRONIZE TO SGATE is not asserted, then the SYNCHRONIZATION POLARITY signal is ignored.

Figure 8:
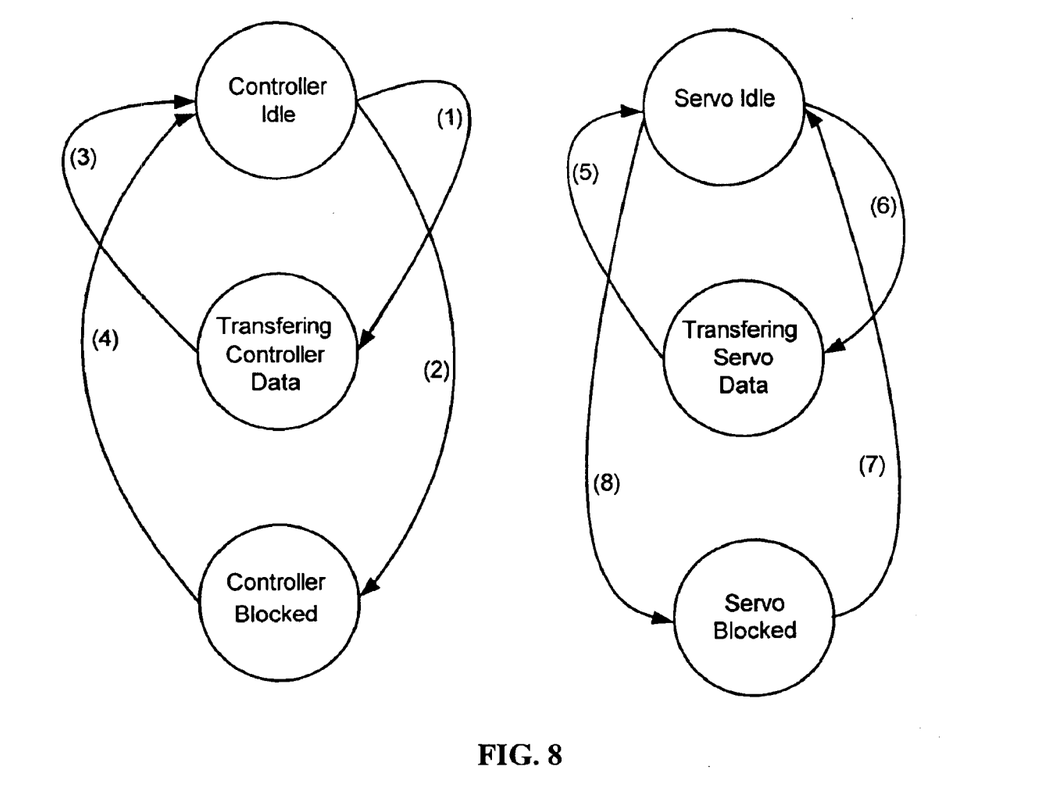
FIG. 8 is a transfer state behavior diagram for an alternate preferred embodiment of the arbitration and data source selection mechanism of FIG. 4.

FIG. 8 shows a transfer state behavior diagram for an alternative embodiment that incorporates the additional control signals shown by FIG. 6 and FIG. 7. A state equation reference table is provided below to aid in viewing the transfer state behavior diagram of FIG. 8.

| State | Equation |
|-------|----------|
| (1) | ((EMPTY == FALSE) & !(CONTROLLER_SYNCHRONIZE_TO_SGATE)) \|\| ((EMPTY == FALSE) & (CONTROLLER_SYNCHRONIZE_TO_SGATE & SELECTED_SGATE_TRANSITION) ) |
| (2) | (LOCK == TRUE) & !(SERVO_SYNCHRONIZE_TO SGATE) |

-continued

| State | Equation |
|---|---|
| (3) | (EMPTY == TRUE) |
| (4) | (LOCK == FALSE) |
| (5) | (EMPTY == TRUE) |
| (6) | ((EMPTY == FALSE) & !(SERVO_SYNCHRONIZE_TO_SGATE)) \|\| ((EMPTY == FALSE) & (SERVO_SYNCHRONIZE_TO_SGATE & SELECTED_SGATE_TRANSITION)) |
| (7) | CLEAR_TO_SEND == FALSE |
| (8) | (CLEAR_TO_SEND) == TRUE) & (LOCK == FALSE) & !(CONTROLLER_SYNCHRONIZE_TO_SGATE) |

Accordingly, embodiments of the present invention are directed to adaptation of a shared communication port in a data storage apparatus. In accordance with one embodiment, an application specific integrated circuit (such as 157) adapted to provide servo control and data transfer control for a disc drive (such as 100) includes a shared communication port (such as 152) with access to the shared communication port controlled by an arbitration and data selection mechanism (such as 150) that arbitrates the use of the shared communication port between a servo process (such as 190) and a controller process (such as 192) for transfer of servo data from a servo FIF0 array (such as 194) of the servo process and transfer of control data from a control FIFO array (such as 196) between the application specific integrated circuit and read/write channel electronics (such as 158) of the disc drive 100.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. An arbitration and data source selection circuit adapted for providing both servo control and data transfer control, characterized as responsive to a combination of servo control signal and a data transfer control signal in prioritizing a transfer sequence for dedicating service of a shared communication port.

2. The circuit of claim 1, in which the communication port comprises a serial port.

3. The circuit of claim 1 wherein a servo engine and a controller collectively comprise an application specific integrated circuit (ASIC), the ASIC further comprising servo control code programmed into the ASIC executing the servo control signal, and control code programmed into the ASIC executing the data transfer control signal.

4. The circuit of claim 3, responsive to a lock signal from the servo control code to dedicate service of the communication port to the servo control code for all states of the control code.

5. The circuit of claim 4 responsive to a servo release signal from the servo control code in combination with a controller request signal from the control code to dedicate service of the communication port to the control code.

6. A data storage device comprising:
a servo engine position-controlling a head relative to a data storage medium;
a controller effecting a data transfer relationship between the head and the medium; and
an arbitration and data source selection mechanism providing both servo control and data transfer control, characterized as responsive to a combination of a servo control signal and a data transfer control signal in prioritizing a transfer sequence for dedicating service of a shared communication port.

7. The data storage device of claim 6, in which the servo engine, the controller, and the arbitration and data source selection mechanism collectively comprise an application specific integrated circuit (ASIC).

8. The data storage device of claim 6, in which the shared communicate on port comprises a serial port.

9. The data storage device of claim 6, in which the servo engine, the controller, and the arbitration and data source selection mechanism collectively comprise an application specific integrated circuit (ASIC), and further in which the shared communication port comprises a serial port.

10. The data storage device of claim 9, in which the ASIC further comprises servo control code programmed into the ASIC executing the servo control signal, and control code programmed into the ASIC executing the data transfer control signal.

11. The data storage device of claim 10, in which the arbitration and data source selection mechanism is responsive to a lock signal from the servo control code to dedicate service of the communication port to the servo control code for all states of the control code.

12. The data storage device of claim 11, in which the arbitration and data source selection mechanism is responsive to a servo release signal from the servo control code in combination with a controller request signal from the control code to dedicate service of the communication port to the control code.

13. A method for prioritizing access to a shared communication port between servo control code and control code of a disc drive comprising:
receiving a servo code word in a servo code first-in first-out array;
receiving a control code word in a control code first-in first-out array; and
engaging an arbitration logic portion of an application specific integrated circuit to prioritize a transfer sequence.

14. The method of claim 13, in which the engaging step comprises setting a servo lock signal with the servo code thereby precluding access by the control code to the shared communication port.

15. The method of claim 14, in which the engaging step comprises releasing the servo lock signal and reading a clear to send signal with the control code, thereby precluding access by the servo code to the shared communication port.

16. The method of claim 13, in which the shared communication port is a serial port.

17. The method of claim 16, in which the engaging step is characterized as the servo control code programmed into the application specific integrated circuit executing the servo code, and the control code programmed into the application specific integrated circuit executing the control code.

18. The method of claim 17, in which the engaging step comprises responding to a signal generated by the servo control code to dedicate service of the communication port to the servo control code.

19. The method of claim 18, in which the engaging step comprises subsequently responding to a servo release signal from the servo control code in combination with a controller request signal from the control code to dedicate service of the serial port to the control code.

20. An arbitration and data source selection circuit adapted for providing both a servo control function and a second function, characterized as responsive to a combination of a first signal associated with the servo control function and second signal associated with the second function in prioritizing a transfer sequence for dedicating service of a shared communication port.

21. The circuit of claim 20 wherein the second function comprises a data transfer control.

22. The circuit of claim 20 responsive to a lock signal from the servo control function to dedicate service of the communication port to the servo control function.

23. An arbitration and data source selection circuit adapted for providing both a first function and a second function, characterized as responsive to a combination of a release signal from the first function in combination with a request signal from the second function in prioritizing a transfer sequence for dedicating service of a shared communication port.

* * * * *